Figure 1:
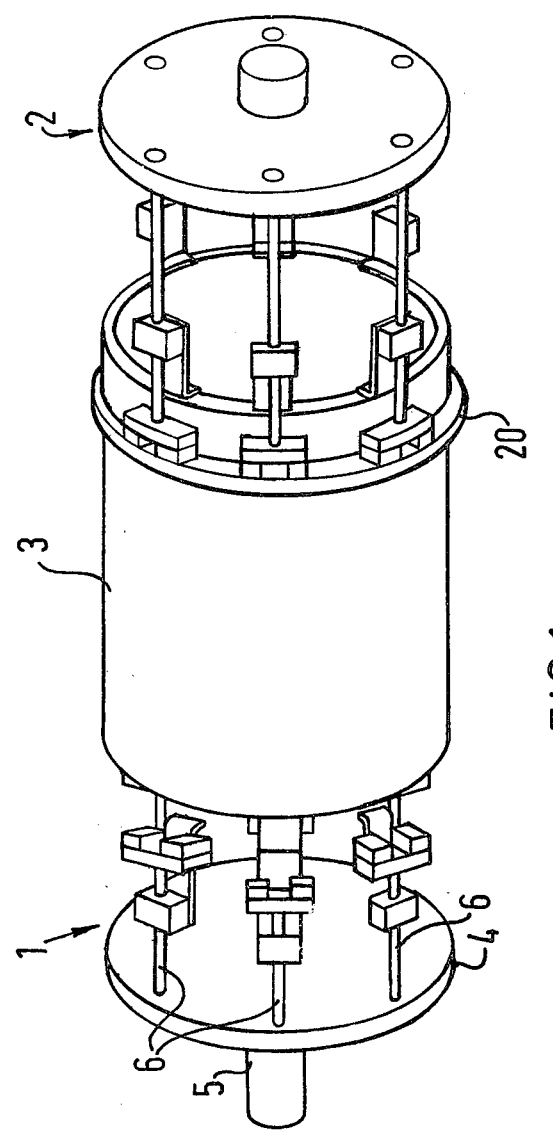

United States Patent [19]

Allitt

[11] 4,264,387
[45] Apr. 28, 1981

[54] TIRE BUILDING WITH BEAD SETTING DEVICE

[75] Inventor: Bernard C. Allitt, Sutton Coldfield, England

[73] Assignee: Dunlop Limited, United Kingdom

[21] Appl. No.: 686,275

[22] Filed: May 14, 1976

[30] Foreign Application Priority Data

May 23, 1975 [GB] United Kingdom ............... 22520/75

[51] Int. Cl.³ ............................................ B29H 17/22
[52] U.S. Cl. ..................................... 156/131; 156/403
[58] Field of Search ............... 156/123, 131, 132, 394, 156/398, 399, 400, 401, 402, 403

[56] References Cited

U.S. PATENT DOCUMENTS

| | | | |
|---|---|---|---|
| 2,605,198 | 7/1952 | Haase | 156/132 |
| 3,121,653 | 2/1964 | Trevaskis | 156/131 |
| 3,257,255 | 6/1966 | Batten | 156/131 |
| 3,434,897 | 3/1969 | Caretta et al. | 156/403 |
| 3,598,673 | 8/1971 | Caretta | 156/132 |
| 3,839,115 | 10/1974 | Leblond et al. | 156/403 |
| 3,944,456 | 3/1976 | Cantarutti | 156/398 |
| 3,950,212 | 4/1976 | Bullmann | 156/403 |

FOREIGN PATENT DOCUMENTS

744801 2/1956 United Kingdom .

*Primary Examiner*—John E. Kittle
*Attorney, Agent, or Firm*—Stevens, Davis, Miller & Mosher

[57] ABSTRACT

In the building of a pneumatic tire on a flat drum or former surrounded by tire plies the beads are positioned intermediate the ends of the former by devices which include fingers having magnets at their leading ends to engage the beads and which are movable axially of the former to displace the beads over the former ends and holders reciprocable relative to the fingers on which the beads are first located, after which the holders and fingers are moved toward the former ends causing retraction of the holders relative to the fingers and displacement of the beads off the holders onto the former by the fingers.

7 Claims, 5 Drawing Figures

TIRE BUILDING WITH BEAD SETTING DEVICE

This invention relates to tire building machines and is particularly concerned with the provision of a bead-setting device for such a machine.

Conventionally, a pneumatic tire is constructed on a former, of substantially cylindrical shape, and, at the appropriate stage in manufacture, the bead wires must be brought on to the former and fitted to the tire carcass. Known tire building drums or formers fall broadly into two categories. In one the tire beads are brought into abutment with the ends of the former, thereby ensuring that they lie in planes to which the axis of the former is perpendicular. In the other type, known as a "flat former", to which the improvement of the present invention relates, the beads are moved a predetermined distance along the former to their final positions spaced from the ends of the former and when using a "flat former" the problem arise of ensuring that the beads are accurately positioned in planes to which the former axis is perpendicular. It is true that a flat former is provided with circumferential grooves to receive the beads, but these are of no assistance in the initial positioning of the beads as at this time the former is surrounded with tire plies which extend over the grooves so that the plies on the former present an uninterrupted cylindrical surface. A slight error in the initial positioning of the beads will not be corrected by their subsequent reception into the grooves as the former is expanded, as the beads will adhere to the plies before the beads finally locate in the grooves, and any subsequent movement of the beads will cause distortion of the plies. To locate the beads on a flat former it has been proposed to provide axially movable bead-setting devices at each end of the former. The operator places the beads on the devices, which may for example, consist of a number of circumferentially disposed axially extending fingers provided with stops to locate the bead axially. The fingers are moved axially inwards to the required position, the former is expanded to grip the beads and the holders are then retracted away. Using the type of device described above accurate positioning of the beads in planes normal to the axis of the former relies on the operator accurately fitting the beads on the devices. This is not always easy to achieve and error in location can be a major cause of non-uniformity in the finished tire.

One object of the present invention is to provide a machine having a bead setting device which enables the beads to be fitted to a flat former with greater accuracy.

According to one aspect of the present invention there is provided a tire building machine comprising a "flat former" (as herein defined), bead holder means reciprocable axially of the former into and away from contact with each end of the former and of diameter such that when retracted from the former a bead may be positioned on the holder means to surround the same, and bead location means surrounding each holder means and axially reciprocable relative thereto, the location means having a leading end face of greater internal diameter than a bead to be positioned on said holder means, which face is provided with means to hold the bead in abutment therewith and lies in a plane to which the axis of the former is perpendicular, the arrangement being such that a bead may be located on each holder means when retracted from the former, the holder means may be moved into contact with the associated end of the former and thereafter the associated location means may be moved to displace the bead from the holder means to a predetermined position along the length of the former while the bead is held in abutment with the leading end face of the location means.

Each said holder means may be slidably engaged with the associated location means for guided movement axially of the former and spring means may be provided to bias the holder means to a normal position extending beyond the associated location means toward the associated end of the former, the arrangement being such that on movement of each said location means toward the former the associated holder means will be retracted against the action of the spring means into the location means following abutment of the holder means with the associated former end, permitting the displacement by the location means of a bead on the holder means from the latter onto the former.

Each said holder means may comprise a plurality of tongues arranged in circumferentially separated relation on a circle concentric with the former axis, each tongue having at its leading end nearer the former a flange directed radially inwardly of said circle to abut the associated end of the former, and each said location means may comprise a plurality of fingers having at their leading ends nearer the former respective abutment members extending circumferentially of a common circle concentric with the former axis in circumferentially spaced relation, said abutment members of each location means having leading end faces which lie in a common plane to which the axis of the former is perpendicular.

Said means to hold the bead in abutment with the leading end face of each location means may be constituted by magnetic means, and each said abutment member may comprise at least one permanent magnet bounded by said plane.

In accordance with another aspect of the invention there is provided a method of building a pneumatic tire by means of a machine as described in the four immediately preceding paragraphs, the method comprising locating an inextensible tire bead on and to surround each said holder means while the latter is retracted from the associated former end, advancing each said holder means into contact with the associated former end, advancing each said location means over the associated holder means and former end so that the bead on said holder means is first abutted by the leading end face of the location means and then held thereagainst in a plane to which the axis of the former is perpendicular while being displaced off the holder means to a predetermined position along the length of the former, expanding the former radially to grip the beads and retracting the location means away from the beads and former.

In the method of the immediately preceding paragraph each bead is preferably held magnetically in abutment with the leading end face of the associated location means during displacement of the associated holder means onto the former.

Figure 2:
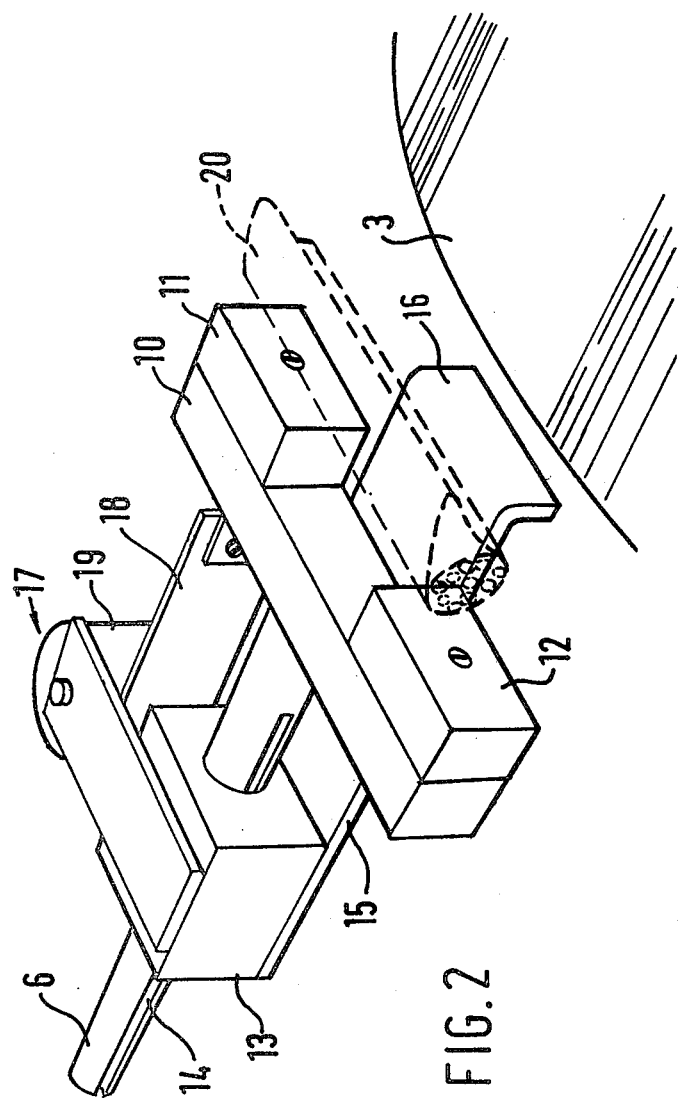

One embodiment of the invention will now be described with reference to the accompanying diagrammatic drawings, in which:

FIG. 1 is a perspective view of a tire building machine in accordance with the invention, FIG. 2 is a perspective view showing in detail a single bead setting device of the machine shown in FIG. 1, and FIGS. 3, 4 and 5 are side views of a modified bead setting device showing different stages of its operation.

The tire building machine shown in FIG. 1 is provided with two bead setting device 1,2 mounted one at each end of a flat tire building former 3. Each device 1 and 2 comprises support means 4 mounted on shaft 5. Means (not shown) are provided to move each support means 4 axially of the former 3. On each support means 4 are six elongated fingers 6 in the form of rods of circular cross-section mounted parallel to the axis of the former and equidistant from it so as to be circumferentially separated around a common circle concentric with the former axis. On the leading end nearer the former of each finger 6 is provided a transversely extending abutment member 10 and on each member 10 are mounted magnets 11, 12 arranged so that their pole faces are bounded by a plane to which the axis of the former is perpendicular, these pole faces jointly constituting the leading end face of bead location means comprising the fingers 6 and abutment members 10.

A block 13 is slidably mounted on the rod 6 and prevented from rotation by means of a key (not visible in FIG. 2) co-operating with a keyway 14 in shaft 6. Rigidly attached to the block is a longitudinally extending tongue 15 the free end of which has a radially inwardly turned flange 16. A spring 17 is provided between the block 13 and plate 10. This is a Tensator spring unit ("Tensator" is a Registered Trade Mark) which comprises a spring strip 18 one end of which is attached to the abutment member 10 and the other wrapped round a reel 19 freely rotatably mounted on the block 13. The spring is naturally curved and requires a tensile force to straighten it as it is pulled from the reel 19.

The plurality of tongues 15 circumferentially separated round a circle concentric with the former axis thus jointly constitute a bead holding means surrounded by each bead location means and axially reciprocable relative thereto, the springs 18 biasing the tongues 15 to an extended position relative to the abutment members 10.

In operation, with the location and holder means at each end of the former retracted away from it a tire bead 20 is loosely located by the operator to surround each series of tongues 15. The device at each end of the former is then moved towards the former 3 until the flange 16 of each tongue 15 comes into contact with the associated end of the former. Further inward movement of each device causes the bead on the holder tongues 15 to be abutted by the members 10 and held by the magnets 11,12 and thereafter carried onto the former, while the block/tongue holder assembly 13, 15 remains stationary and is held against the former by the springs 18 until the required position is reached. The device 2 in FIG. 1 is shown in this position. The former 3 is thereafter expanded to engage and grip the inextensible beads 20, after which the abutment members 10 can be retracted away from the former back to their starting positions. The abutment members 10 are not engaged by the former as the inner diameter of the interrupted-annular leading end of each bead location means constituted by the abutment members 10 is greater than the inner diameter of each bead 20.

Figure 3:
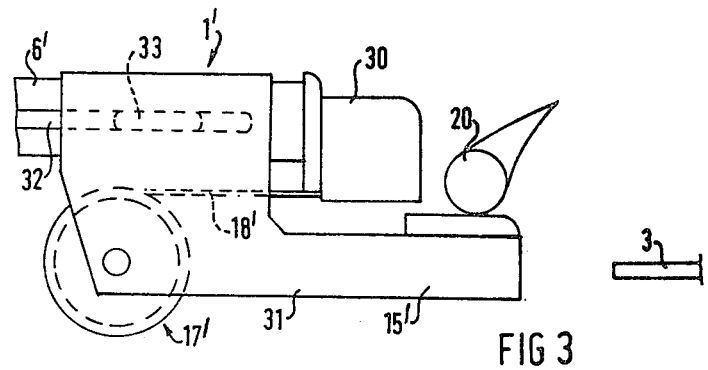
Figure 4:
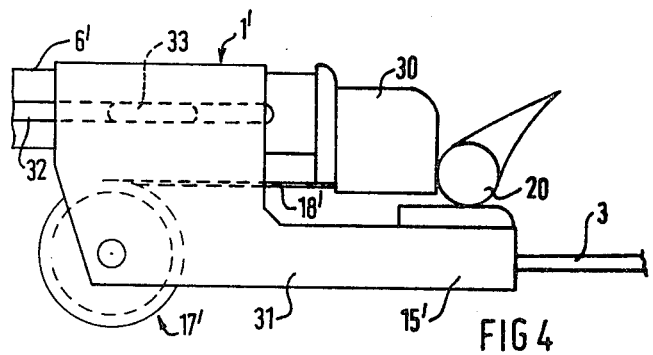
Figure 5:
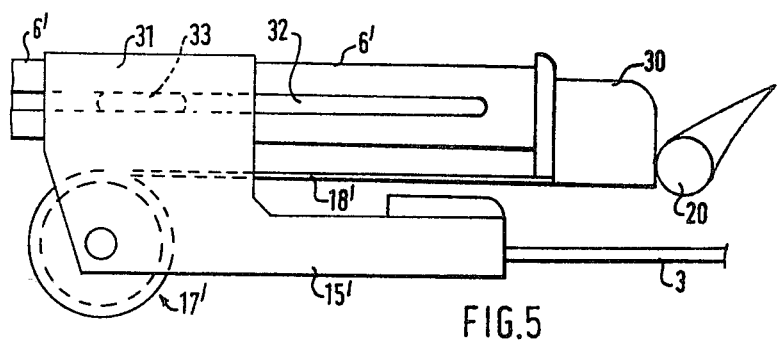

In the modification illustrated in FIGS. 3 to 5 the magnets (not shown) are located in housings such as 30 on the leading ends of the fingers 6 and the tongues 15 are extensions of sleeves 31 surrounding the fingers. Each finger 6 is formed with a longitudinal slot 32 in which a key 33 spanning the sleeve 31 thereon is slidable and a Tensator spring 17' is slung under the sleeve 31, one end of the spring strip 18' being anchored to the housing 30. With the device 1' of FIGS. 1 to 3 retracted from the associated end of the former 3 (FIG. 3) a bead assembly 20 is located on the tongues 15', after which the device 1' is advanced toward the former, causing retraction of the tongues 15' relative to the fingers 6' against the action of the spring 18' after the tongues 15' contact the former end (FIG. 4) so that the bead assembly 20 is picked up by the magnets and held in abutment with the leading end face of each finger. Continued movement of the fingers 6' in the same direction causes the bead assembly 20 to be carried to a final position intermediate the ends of the former 3 (FIG. 5).

It will be evident that if desired the fingers 6 and abutment members 10 could be replaced by a single, annular bead location means and that the tongues 15 could be replaced by a single annular bead holding means. It will also be evident that interconnection of the relatively movable bead location and bead holding means is not essential.

Having now described my invention, what we claim is:

1. A tire building machine for automatically correctly positioning a bead wire around a cylindrical flat former comprising a cylindrical flat former, bead holder means mounted coaxially with respect to the flat former and reciprocable axially of the former into and away from contact with each end of the former and of diameter such that when retracted from the former a bead may be positioned on the holder means to surround the same and be substantially coaxially aligned with respect to said former, and bead location means surrounding each holder means and connected therewith to permit only axial reciprocable movement relative thereto, the location means having a leading end face of greater internal diameter than a bead to be positioned on said holder means, which face is provided with means to hold the bead in abutment therewith and lies in a plane to which the axis of the former is perpendicular in all positions of the location means relative to the holder means and former, the location means being movable relative to the associated holder means in response to contact of the holder means with the former to align the beads in a plane normal to said former and to further displace the coaxially positioned and aligned beads from the respective holder means to predetermined positions along the length of the former while the bead is held in abutment with the leading end face of the location means.

2. A machine as claimed in claim 1, wherein each said holder means is slidably engaged with the associated location means for guided movement axially of the former and wherein spring means is provided to bias the holder means to a normal position extending beyond the associated location means toward the associated end of the former.

3. A machine as claimed in claim 1 wherein each said holder means comprises a plurality of tongues arranged in circumferentially separated relation on a circle concentric with the former axis, each tongue having at its leading end nearer the former a flange directed radially inwardly of said circle to abut the associated end of the former, and wherein each said location means comprises a plurality of fingers having at their leading ends nearer the former respective abutment members extending circumferentially of a common circle concentric with the former axis in circumferentially spaced relation, said abutment members of each location means having leading end faces which lie in a common plane to which the axis of the former is perpendicular.

4. A machine as claimed in claim 1, wherein said means to hold the bead in abutment with the leading end face of each location means is constituted by magnetic means.

5. A machine as claimed in claim 1, wherein each said location means comprises at least one permanent magnet at a leading end thereof.

6. A method of building a pneumatic tire on a machine having a cylindrical former, bead holder means mounted coaxially with respect to the flat cylindrical former and reciprocable axially in relation to the former, bead location means surrounding each holder means and axially reciprocable relative thereto, the method comprising locating an inextensible tire bead on and to surround each said holder means while the latter is retracted from the associated former end, advancing each said holder means into contact with the associated former end, advancing each said location means over the associated holder means and former end so that the bead on said holder means is first abutted by the leading end face of the location means and then held thereagainst in a plane to which the axis of the former is perpendicular while being displaced off the holder means to a predetermined position along the length of the former, expanding the former radially to grip the beads and retracting the location means away from the beads and former.

7. A method as claimed in claim 6, wherein each bead is held magnetically in abutment with the leading end face of the associated location means during displacement of the associated holder means onto the former.

* * * * *